May 19, 1959    R. J. STANTON ET AL    2,887,560
WELDING OF SEAMS BY HIGH FREQUENCY RESISTANCE HEATING
Filed Jan. 11, 1957    2 Sheets-Sheet 1
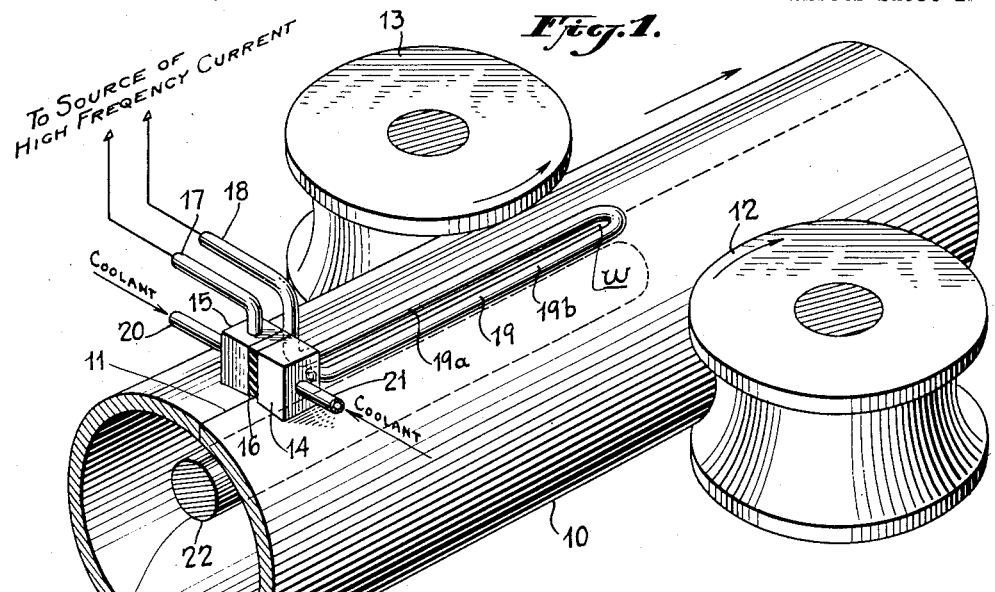
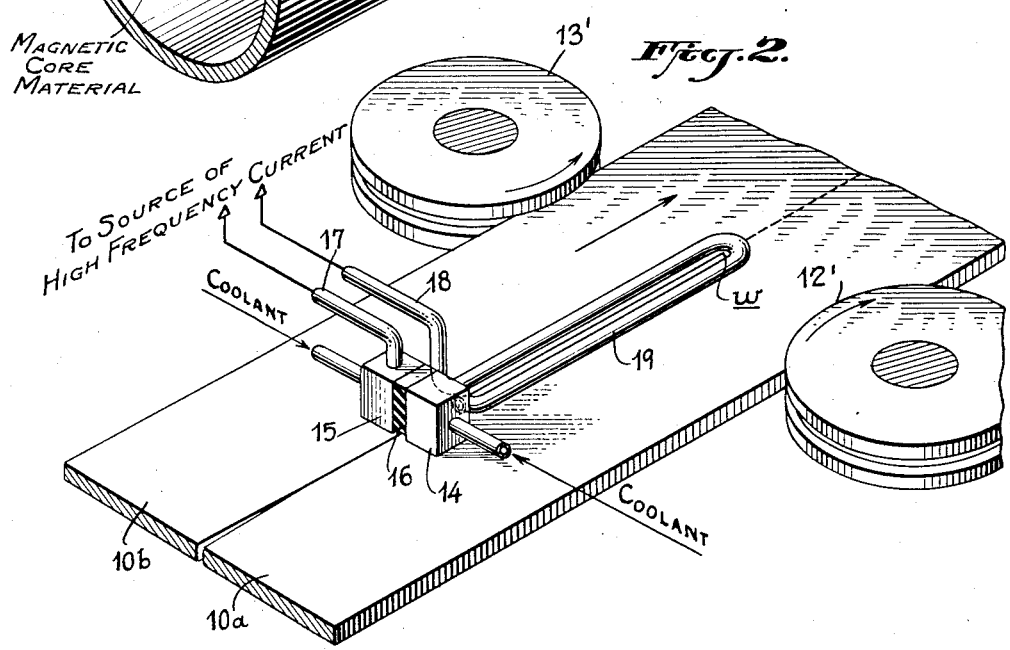
INVENTORS.
ROBERT J. STANTON.
WALLACE C. RUDD.
BY
Ward Neal Haselton Orme & McElhannon
ATTORNEYS.

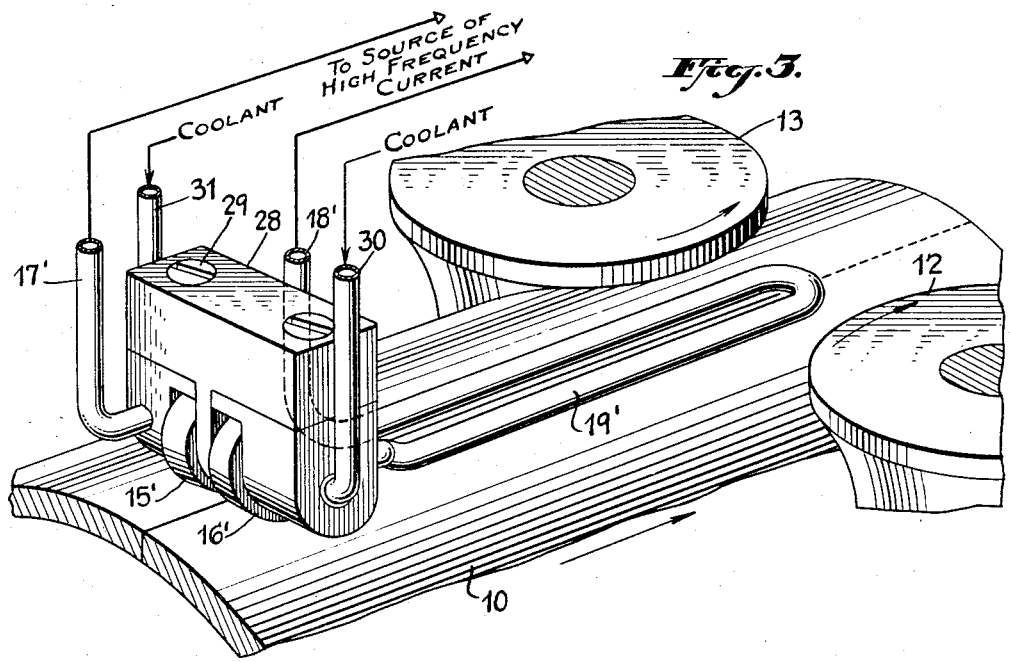
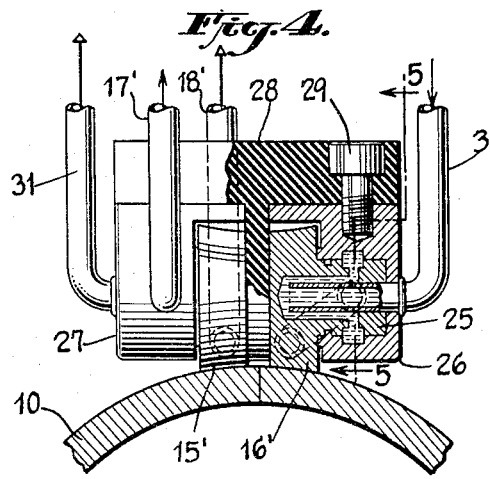
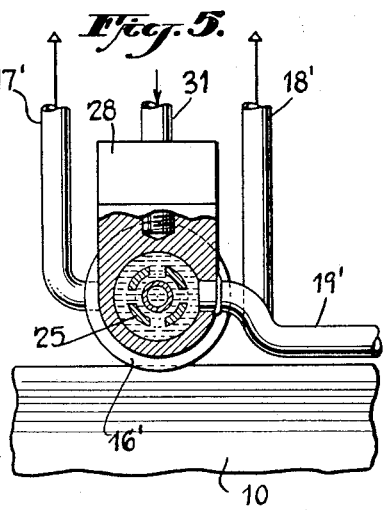
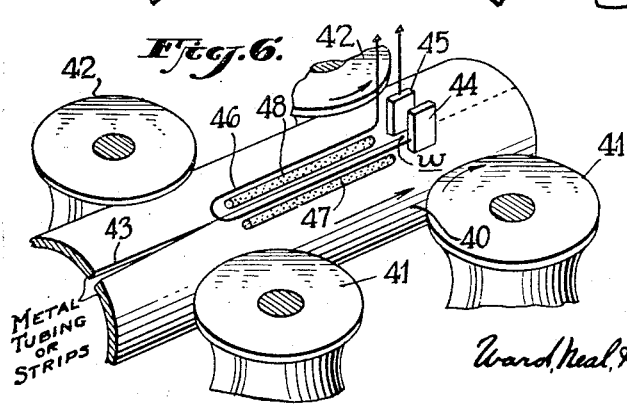

United States Patent Office 2,887,560
Patented May 19, 1959

2,887,560

WELDING OF SEAMS BY HIGH FREQUENCY RESISTANCE HEATING

Robert J. Stanton, Brooklyn, and Wallace C. Rudd, Larchmont, N.Y., assignors to Magnetic Heating Corp., New Rochelle, N.Y., a corporation of New York Application January 11, 1957, Serial No. 633,671

12 Claims. (Cl. 219—67)

This invention relates to methods and apparatus adapted for high frequency resistance heating of metal along elongated narrow paths, and useful among other possible purposes, for the welding of longitudinal seams in metal tubing, or seams along which two metal portions such as strips are welded together.

In our co-pending application Serial No. 421,768, filed April 8, 1954, on which U.S. Patent No. 2,818,488, was granted on December 31, 1957 (and in our preceding U.S. application Serial No. 332,422, filed January 21, 1953, and now abandoned, the subject matter of such applications being also disclosed in Belgian Patent No. 530,877, granted August 31, 1954) we disclosed a method for welding a longitudinal gap in tubing involving the advancing of the tubing past a weld point while maintaining a V-shaped gap between the edges to be welded, the weld point occurring substantially at the apex of such gap. And with such method, high frequency current was applied to contacts slidably engaging the gap edges substantially in advance of the weld point so that heating current was caused to flow from such contacts along the gap edges to and from the weld point. Also in some cases, in order to aid in concentrating the current along the gap edges, a generally hairpin shaped conductor turn was positioned above the gap, such turn being in series with the heating current.

While such a method involving high frequency resistance heating of the edges along such a V-shaped gap has operated very successfully under most conditions, yet the maintenance of such a gap with accurately predetermined dimensions as desirable to produce uniform results, has involved some difficulty, since in many cases the width of the gap at the points where the edges are about to be welded is quite narrow, rendering it difficult to provide and properly maintain suitable spreader means in the gap which will resist wear and not cause irregular movements or vibration of the tubing. Hence for these reasons it has appeared desirable, if possible, to provide some means of maintaining the high frequency heating current along the edges to be welded, but while avoiding the difficulties of such a V-shaped gap. However, if the current is to be applied by contacts engaging the tubing along opposite sides of the line of the seam to be welded, and if the gap is closed at this point so that the edges are abutting and in contact, one would naturally suppose that this would short-circuit the two contacts and that hence the heating effect in the metal of the tubing would be confined to the immediate vicinity of the contacts and not extend along the edges to be welded to and from the welding point. However, if the gap in the tubing is closed before the tubing reaches the contacts and if the contacts are located and connected as disclosed in the above-mentioned applications and Belgian patent, it has been found quite surprisingly that such a short-circuiting effect does not in fact occur if the current used is of a high frequency. Instead the action of the above-mentioned hairpin-shaped conductor turn is such that the lowest impedance path for the current flowing in the tube metal between one of the contacts to the other, will be along one of the gap edges from the first contact to the weld point, thence back along the other edge to the other contact, even though the longitudinal gap in the tubing is closed.

The arrangement is such that it not only affords the quite unexpected result of causing effective heating of the gap edges even though the gap is closed, but additionally, with the gap closed, it has been found that the arrangement is surprisingly effective toward eliminating waste flows of current along paths around the back of the tubing opposite from the region of the desired welded seam.

Various further and more specific objects, features, and advantages of the invention will appear from the description given below, taken in connection with the accompanying drawings illustrating by way of example certain preferred forms of the invention.

In the drawings:

Fig. 1 is a perspective view of a preferred embodiment of the apparatus for practicing the invention as applied to the welding of a longitudinal seam in tubing;

Fig. 2 is a perspective view of a like arrangement as applied to the problem of welding opposed edges of two longitudinally moving metal strips;

Fig. 3 is a view similar to Fig. 1 but showing an arrangement making possible the use of roller contacts instead of sliding contacts on the moving tubing;

Fig. 4 is an end view partly in vertical section of the arrangement of Fig. 3;

Fig. 5 is a view partly in vertical section taken substantially along line 5—5 of Fig. 4; and Fig. 6 is a schematic diagram of another alternative embodiment of the invention.

Referring to Fig. 1 of the drawings in further detail, an advancing length of tubing is indicated at 10, having a longitudinal gap as at 11 which has been closed at some point in advance of the position of the tubing as shown in this figure. That is, the gap edges have been brought into direct contact in substantially the positions which they will assume after being welded together. As the tubing advances, such edges pass a weld point indicated at w, this point preferably being at the region where the tubing passes between a pair of pressure rollers as at 12, 13. These rollers may form a part of a suitable known type of a so-called tube mill, and if desired, may be suitably driven to form part of the means for advancing the tubing through the mill.

A pair of contacts are shown at 14 and 15, so positioned as slidably to engage the surface of the tubing at opposite sides respectively of the seam line 11, these contacts being spaced apart with the space therebetween if desired filled by a suitable block of heat resistant insulating material as indicated at 16.

The terminals of a source of high frequency electrical current are indicated at 17 and 18. The terminal 17 for example may be directly connected to contact 15, whereas the terminal or conductor 18 is formed preferably integral with a hairpin-shaped conductor turn such as above mentioned and as indicated at 19, such turn being located to extend along in slightly spaced relation above the line of the seam and extending from a region near the contacts to the region of the weld point, one side of the turn being located above one of the edges at the seam line, and the other side of the turn being located above the opposed edge. Thus the current path from terminal 18 will extend along one side of the hairpin-shaped turn as indicated at 19a out to a point above or in the region of the weld point and back along the other side of the turn indicated at 19b to contact 14. Thence from contact 14 current will flow in the tube metal or substantially on the surface thereof along to one side of the line of the seam out to the weld point and thence in or substantially on the surface of the tube metal along the other side of the seam line, back to the contact 15 and terminal 17.

A suitable known type of source for the high frequency current may be provided and the frequency should at least be as high as about 100 kilocycles and preferably higher, for example 200, 300 or even 400 kilocycles per second or higher. While from inspection of Fig. 1, it would naturally be supposed that contacts 14 and 15 would be substantially directly short-circuited by the metal of the tubing with the edges at the gap closed as shown, so that there would be no appreciable heating effect in the tubing except in the vicinity of the contacts, yet as above stated, this is surprisingly not the case. Instead a very large majority of the current flowing from one contact to the other will pass along on the opposite sides of the seam line from the contacts to and from the weld point. Quite unexpectedly it has been found that the effect of the hairpin-shaped turn is adequate even with the tube gap closed to cause the current paths of lowest reactance between the contacts to occur along beneath the hairpin turn, rather than directly across the seam line between the contacts. To afford sufficient time for the line of the weld to be heated up to welding temperature, the conductor turn 19 preferably, as shown, is of a length many times the distance between contacts 14, 15. Yet surprisingly, for the reasons above explained and with currents of the frequency of the order of 100,000 cycles per second or higher, the desired heating will very largely occur along beneath conductor 19 rather than directly between the contacts. Thus the contact surfaces and the metal at the points of contact therewith remain relatively cool and quite free of any danger of injury by overheating.

As further explained in the above-mentioned copending application and Belgian patent, it is necessary with equipment of this kind to provide cooling means for the conductor leads and for the contacts. To this end the conductor leads 17, 18 and the hairpin-shaped turn 19 may be formed of metal tubing having passages communicating with suitable cavities in the contacts to permit cooling fluid such as water to be introduced through tubes as at 20 and 21 to flow through the contacts and thence through the connections 17, 18 and 19.

As further disclosed in said co-pending application and Belgian patent, core means of magnetic material may be mounted in stationary position inside the tubing for appropriately controlling the flow of high frequency current in the tubing. Such magnetic core means may take the form of a rod or rods formed of finely divided ferromagnetic material mixed with suitable insulation material, for example such rods may be formed of sintered magnetic oxide, an insulation material, preferably of types now well known per se and which will have a low loss factor and high volume resistivity for example, such as the material marketed under the name Ferramic by General Ceramic and Steatite Corp. It will be understood that other magnetic core means may be used, preferably such that it will have a permeability (mu) greater than 1 (preferably substantially greater) and preferably the magnetic particles being in divided form such that any current losses therein will be minimized. For example, finely divided iron carbonyl mixed with a suitable synthetic resinous insulating material may be used. One of such rods is indicated at 22 in Fig. 1 and may be suitably positioned by trial at various locations either further to minimize the flow of current in paths around the back of the tubing or to control the relative amounts of current which flow along the lower portion of the seam as compared with the flow in upper portions of the seam. A number of rods such as indicated at 22 may be used for these purposes and the single rod shown is intended merely to be illustrative and to indicate one possible position of adjustment of such a rod.

The arrangement shown in Fig. 2 is similar to that of Fig. 1, except that in Fig. 2, the equipment is shown as applied to the welding together of opposed longitudinal edges of two metal strips as at 10a and 10b, the rollers 12' and 13' being suitably shaped to engage the strip edges as shown.

The arrangement shown in Figs. 3, 4 and 5 is also similar to that of Fig. 1, except that instead of sliding contacts, contacts of roller form are provided as indicated at 15', 16', these rollers having suitable bearings as at 25 provided in stationary blocks as at 26 and 27, the blocks being held in spaced-apart relation as by an insulation piece 28, secured as by screws 29. As best indicated in Figs. 4 and 5, cooling fluid may be introduced through tubes as at 30 and 31 into the bearing areas and thence, after acting to cool the roller contacts, passing out through connections 17', 18' and 19'.

It will be understood that roller contact arrangements similar to that of Fig. 3 may be used in case longitudinal strips are to be welded together, for which purpose the apparatus will be like that of Fig. 2, except for substitution of the roller contacts.

Fig. 6 illustrates somewhat schematically further ways in which the invention may be modified. Here a tube 40 is being advanced in the direction indicated by the arrow, between pairs of rollers as at 41, 42 which act to close the gap 43 in the tube at a region substantially in advance of the weld point. With this embodiment of the invention, the electrodes as at 44, 45 and the hairpin shaped turn 46 may all be of a fluid-cooled construction like the electrodes and hairpin shaped turn respectively of any of the above described figures, except that here the arrangement is reversed in position. That is to say, the electrodes instead of being located substantially in advance of the weld point are located at or near the region of the weld point and the hairpin shaped turn is directed rearwardly instead of forwardly therefrom. This illustrates the quite striking fact that, although there is a relatively short and direct conductive path between the electrodes formed by the metal of the tubing and with the gap welded together, still a large proportion of the current will flow in the tubing along the low reactance path provided beneath the hairpin shaped turn 46 and sufficient adequately to heat the closed gap edges progressively up to welding temperature as the weld point w is reached.

A further feature illustrated in Fig. 6 is the provision of strips or rods of magnetic material as at 47, 48 arranged along beneath the two branches respectively of the hairpin shaped turn in spaced relation thereto as well as with respect to the tube metal. Such strips of magnetic material may be formed of sintered magnetic oxide or other materials as above described in reference to the rod 22 of Fig. 1.

Such magnetic strips may be suitably supported preferably in adjustable positions by any desired insulated supporting means (not shown). By varying the spacing of these strips with respect to the tube metal and with respect to the line of the desired seam, the current flowing along the seam may be controlled so as to be more or less concentrated at the line of the seam or so as to control the current flow whereby it will not be concentrated excessively along the outside surface of the seam only, but will tend to heat more uniformly the depth of the seam.

In general, the bringing of the magnetic elements close to the paths along which the high frequency current is flowing, causes an increase in the reactance of such current paths, thereby tending to cause the current paths to shift further from the magnetic elements, for example toward the seam and toward the lower side of the seam, whereas in the absence of the magnetic elements, the current paths would tend more to be along the upper side of the seam and somewhat more distributed to either side thereof.

So many factors ar involved in determining whether the heating effect will tend to occur more along the outside of the seam than at points closer to or at the inside of the seam, that it is preferable to determine by trial just where the strips of magnetic material may best be located and how far they may best be spaced from the hairpin turn and from the tube metal in order to control a desired heat pattern within the seam.

In case an arrangement like that of Fig. 6 is used to weld together two longitudinally moving strips instead of a tube and if the strips are of different metals or of alloys, for example, having different properties when heated, then to secure an appropriate heat pattern in the seam to be welded, one of the strips of magnetic material may be adjusted at one side of the seam with the spacing from the metal more or less than the spacing of the strip of magnetic material on the other side of the seam, or one of the strips may be omitted entirely in order to assure the desired degree of heating in the respective edges of each strip.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding a seam extending along opposed edges of two elongated metal portions which comprises: advancing said portions with their said edges passing along the line of the desired seam and past a weld point, while conducting current from the two terminals of a source of high frequency current respectively to said metal portions at two closely spaced positions adjacent the line of the desired seam, said positions being substantially in advance of said weld point; maintaining said edges in contact with each other as they pass said positions and until they reach said weld point; and also conducting said current along a substantially hairpin-shaped path located to extend along and in closely spaced relation to said line, the apex of such hairpin-shaped path being located near the region of the weld point and the branches thereof extending back along said line, said current being of a frequency of the order of about 100,000 cycles per second or higher whereby the greater part of the current flowing in said metal portions from one of said positions to the other will flow along said edges to and from the weld point and cause said edges progressively to be heated to the welding temperature upon reaching the weld point, the current flowing in said hairpin-shaped path acting to cause the path of lowest impedance between said positions on said metal portions to occur alongside the desired seam to and from the weld point.

2. Method in accordance with the foregoing claim 1 and in which said two metal portions comprise portions of a length of tubing and said edges comprise the opposed edges of a closed gap extending along the desired line of the welded seam on the tubing.

3. Method for welding a seam extending along opposed edges of two elongated metal portions which comprises: advancing said portions with their said edges passing along the line of the desired seam and past a weld point while conducting current from the two terminals of a source of high frequency current respectively to points on said metal portions at two closely spaced positions on opposite sides of the line of the desired seam, said positions being substantially in advance of said weld point; maintaining said edges in contact with each other as they pass said positions and until they reach said weld point; and also conducting said current along a substantially hairpin-shaped path located to extend along and in closely spaced relation to said line, the apex of such hairpin-shaped path being located near the region of the weld point and one branch thereof extending back along one of said edges and thence connected to one terminal of the current source and the other branch of said path extending back along the other of said edges to form the current connection to one of said positions, said current being of a frequency of the order of about 100,000 cycles per second or higher whereby the greater part of the current flowing in said metal portions from one of said positions to the other will flow along said edges to and from the weld point and cause said edges progressively to be heated to welding temperature upon reaching the weld point, the current flowing in said hairpin-shaped path acting to cause the path of lowest impedance between said positions on said metal portions to occur alongside the desired seam to and from the weld point.

4. Method for welding a seam extending along opposed edges of two elongated metal portions which comprises: advancing said portions with their said edges passing along the line of the desired seam and past a weld point while conducting current from the two terminals of a source of high frequency current respectively onto points on said metal portions at two closely spaced positions adjacent the line of the desired seam; maintaining said edges in firm contact with each other for a distance substantially in advance of the weld point; also conducting said current along a substantially hairpin-shaped path located to extend along and in closely spaced relation to said line and for a substantial distance in advance of the weld point, whereby such current will flow through said hairpin-shaped path to one of said positions, thence along on one of said edges beneath one branch of said hairpin-shaped path to the apex thereof, thence along the other of said edges to the other of said positions, the current flowing in said hairpin-shaped path acting to cause a path of low impedance between said positions on said metal portions to occur along one side of the desired seam and in the reverse direction along the other side of the seam, said current being of a frequency of the order of about 100,000 cycles per second or higher, whereby a sufficient part of the current flowing in said metal portions from one of said positions to the other will flow along said edges to and from the weld point and cause the edges to be progressively heated to welding temperature upon reaching the weld point.

5. Method for welding a seam extending along opposed edges of two elongated metal portions which comprises: advancing said portions with their said edges passing along the line of the desired seam and past a weld point while conducting current from the two terminals of a source of high frequency current respectively onto points on said metal portions at two closely spaced positions on opposite sides of the line of the desired seam, said positions being adjacent the weld point; maintaining said edges in firm contact with each other for a distance substantially in advance of the weld point; also conducting said current along a substantially hairpin-shaped path located to extend back along and in closely spaced relation to said line and for a substantial distance in advance of the weld point, whereby such current will flow through said hairpin-shaped path to one of said positions, thence back along on one of said edges beneath one branch of said hairpin-shaped path to the apex thereof, thence forwardly along the other of said edges to the other of said positions, the current flowing in said hairpin-shaped path acting to cause a path of low impedance between said positions on said metal portions to occur along one side of the desired seam and in the reverse direction along the other side of the seam, said current being of a frequency of the order of about 100,000 cycles per second or higher, whereby a sufficient part of the current flowing in said metal portions from one of said positions to the other will flow along said edges for a substantial distance in advance of the weld point and cause the edges to be progressively heated to welding temperature upon reaching the weld point.

6. Apparatus for welding a seam along opposed edges of two elongated metal portions which comprises: means for rapidly advancing said portions with their edges passing along the line of the desired seam and past the weld point; means for causing said edges to be pressed into engagement at a region substantially in advance of the weld point and firmly together at the weld point; a source of electrical heating current of a frequency of the order of 100,000 cycles per second or higher; a pair of contacts positioned to engage said portions adjacent the line of the desired seam; and connections for connecting the terminals of said source respectively to said contacts, one of said connections including a generally hairpin-shaped portion, one branch of which extends from one of said contacts for a substantial distance along close to and above said line and then reversing and continuing as its other branch also for a substantial distance close to and above said line and to a point close to the other of said contacts, and thence to a terminal of said source, the current flowing in said harpin-shaped portion acting to cause the path of lowest impedance between said contacts for said high frequency current, to occur on said metal portions along the desired seam to and from the weld point, despite the contacting condition of said edges, and causing said engaging edges progressively to be heated to welding temperature upon reaching said weld point.

7. Apparatus in accordance with the foregoing claim 6 in combination with means for increasing the reactance of current paths on said metal portions spaced from the line of the desired seam to thereby cause concentration of the current flow along at said line, such means comprising: masses of magnetic but substantially insulating material having a low loss factor, high volume resistivity and magnetic permeability substantially greater than unity, such masses being located close to such desired paths of increased reactance.

8. Apparatus in accordance with the foregoing claim 6 and in which said pair of contacts is located in advance of the weld point and said hairpin-shaped portion is positioned with its apex substantially at the region just above the weld point and with its branches extending back to the region of the contacts.

9. Apparatus in accordance with the foregoing claim 6 and in which said pair of contacts is positioned at the region of the weld point and the branches of said hairpin-shaped portion extend back from the region of the contacts, whereby the apex of the hair-pin shaped portion is substantially in advance of the weld point.

10. Apparatus in accordance with the foregoing claim 6 and in which said contacts comprise roller contacts and in which means are provided for the internal fluid cooling of said roller contacts and of said connections thereto.

11. Apparatus for high frequency resistance heating of an elongated metal object along a predetermined desired line thereon, comprising in combination: a source of electrical heating current of a frequency of the order of 100,000 cycles per second or higher; a pair of contacts for conducting current supplied from such source to said object at closely spaced positions thereon; means for rapidly and longitudinally advancing said object in a direction along the desired line of heating thereon, and with the metal of the object directly bridging the space between said contacts; and fluid-cooled connections extending between the terminals of said source and said contacts respectively, one of said connections including a loop-like portion which extends from one of said contacts out along and in closely-spaced relation to the desired line of heating for a distance many times the spacing of said contacts, and thence back along in closely-spaced relation to said line to a point adjacent the other contact, and thence to said source, the current flowing in said loop-like portion acting to cause the paths of lowest impedance between said contacts for said high frequency current, to occur on said object along said desired line, despite such bridging of the space between the contacts, and thereby causing progressive heating of the object along said line as the object advances along said loop-like portion.

12. Method for high frequency resistance heating of a metal object along a predetermined desired line thereon, comprising: applying a pair of contacts to said object at closely-spaced positions and with the metal of the object directly bridging the space between said contacts; supplying said contacts with current from a source having a frequency of the order of 100,000 cycles per second or higher, the current connection for one of said contacts extending as a loop-like connection which extends from such contact out along and in closely-spaced relation to the desired line of heating on the metal object for a distance many times the spacing between said contacts and thence back along in closely-spaced relation to the desired line of heating to a point adjacent the other contact and thence to the source, the current flowing in said loop-like connection acting to cause the path of lowest impedance between said contacts for said high frequency current, to occur on said object along said desired line, despite such bridging of the space between the contacts, and whereby the heating current is conducted on the object from one contact along on said path of lowest impedance to the other contact.

References Cited in the file of this patent

UNITED STATES PATENTS

| | | |
|---|---|---|
| 2,460,687 | Fuchs | Feb. 1, 1949 |
| 2,794,108 | Park | May 28, 1957 |

FOREIGN PATENTS

| | | |
|---|---|---|
| 1,095,095 | France | Dec. 15, 1954 |
| 716,378 | Great Britain | Oct. 6, 1954 |